US012265414B2

(12) United States Patent
Parakh et al.

(10) Patent No.: US 12,265,414 B2
(45) Date of Patent: Apr. 1, 2025

(54) PIECEWISE CORRECTION OF ERRORS OVER TEMPERATURE WITHOUT USING ON-CHIP TEMPERATURE SENSOR/COMPARATORS

(71) Applicant: TEXAS INSTRUMENTS INCORPORATED, Dallas, TX (US)

(72) Inventors: Praful Kumar Parakh, Kolkata (IN); Anand Kannan, Bangalore (IN); Sunil Rafeeque, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 158 days.

(21) Appl. No.: 17/868,684

(22) Filed: Jul. 19, 2022

(65) Prior Publication Data

US 2022/0350360 A1 Nov. 3, 2022

Related U.S. Application Data

(62) Division of application No. 15/962,515, filed on Apr. 25, 2018, now Pat. No. 11,409,317, which is a division of application No. 14/949,390, filed on Nov. 23, 2015, now Pat. No. 9,971,375.

(30) Foreign Application Priority Data

Sep. 16, 2015 (IN) .......................... 4946/CHE/2015

(51) Int. Cl.
*G05F 3/24* (2006.01)

(52) U.S. Cl.
CPC .................................. *G05F 3/245* (2013.01)

(58) Field of Classification Search
CPC .... G06G 7/18; G05F 1/10; G05F 3/24; G05F 3/242; G05F 3/245; G05F 3/247; G05F 3/26; G05F 3/262; G05F 3/02; G05F 3/30
USPC .................................................. 327/512, 513
See application file for complete search history.

(56) References Cited

U.S. PATENT DOCUMENTS

| | | | | |
|---|---|---|---|---|
| 5,818,294 | A | 10/1998 | Ashmore | |
| 6,754,476 | B1 | 6/2004 | Reinhardt | |
| 6,930,538 | B2 * | 8/2005 | Chatal | G05F 3/267 327/539 |
| 8,102,201 | B2 | 1/2012 | Marinca | |
| 8,981,833 | B2 | 3/2015 | Lemkin et al. | |
| 9,568,928 | B2 | 2/2017 | Meyers | |
| 9,971,375 | B2 | 5/2018 | Parakh et al. | |

* cited by examiner

*Primary Examiner* — Hai L Nguyen
(74) *Attorney, Agent, or Firm* — John R. Pessetto; Frank D. Cimino

(57) ABSTRACT

A temperature dependent correction circuit includes a first supply source, a second supply source, a rectifying circuit, and a reference. The first supply source is configured to supply a first signal that varies with temperature along a first constant or continuously variable slope. The second supply source is configured to supply a second signal that varies with temperature along a second constant or continuously variable slope. The rectifying circuit is configured to receive the first and second signal, rectify the first signal to produce a first rectified signal, and add the first rectified signal to the second signal to produce a correction signal. The reference is configured to receive the correction signal.

10 Claims, 3 Drawing Sheets

PIECEWISE CORRECTION OF ERRORS OVER TEMPERATURE WITHOUT USING ON-CHIP TEMPERATURE SENSOR/COMPARATORS

CROSS REFERENCE TO RELATED APPLICATION(S)

This divisional application claims priority to U.S. patent application Ser. No. 15/962,515 filed Apr. 25, 2018, now U.S. Pat. No. 11,409,317B2 issued on Aug. 9, 2022, which is a divisional of U.S. patent application Ser. No. 14/949,390 filed Nov. 23, 2015, now U.S. Pat. No. 9,971,375 B2 issued on May 15, 2018, which application claims priority to Indian provisional application No. 4946/CHE/2015, filed Sep. 16, 2015, all of which are incorporated herein by reference.

BACKGROUND

In many applications, voltage and/or current output varies (i.e., drifts) based on temperature. For example, a voltage reference may generate a larger output voltage at higher temperatures than at lower temperatures or vice versa. Similarly, a current reference may generate a larger output current at higher temperatures than at lower temperatures or vice versa. Since it is desirable in many of these applications to produce a constant output signal and/or a signal that does not drift based on temperature changes, signal corrections may be applied. These temperature dependent signal corrections for output drift are important for the operation of many precision applications such as references, temperature sensors, temperature calibration devices, etc. Systems may correct the output drift in these applications by applying a correction signal to the device that generates the signal output. Global temperature correction is an attempt to correct the output signal drift by applying an average correction signal over the entire temperature range. Piecewise temperature correction is an attempt to correct the output signal drift by applying different signal corrections for different temperature ranges.

SUMMARY

The problems noted above are solved in large part by systems and methods for generating a corrected output signal from a reference utilizing a correction signal. In some embodiments, a temperature dependent correction circuit includes a first supply source, a second supply source, a rectifying circuit, and a reference. The first supply source is configured to supply a first signal that varies with temperature along a first constant or continuously variable slope. The second supply source is configured to supply a second signal that varies with temperature along a second constant or continuously variable slope. The rectifying circuit is configured to receive the first and second signals, rectify the first signal to produce a first rectified signal, and add the first rectified signal to the second signal to produce a correction signal. The reference is configured to receive the correction signal.

Another illustrative embodiment is a method that may comprise generating a first signal that varies with temperature along a first constant or continuously variable slope. The method may also comprise generating a second signal that varies with temperature along a second constant or continuously variable slope. The method may also comprise rectifying the first signal to produce a first rectified signal. The method may also comprise adding the first rectified signal to the second signal to produce a correction signal. The method may also comprise generating a first reference signal that varies with temperature. The method may also comprise adding the correction signal to the first reference signal to produce an output signal.

Yet another illustrative embodiment is a reference. The reference may comprise generation logic and adding logic. The generation logic may be configured to generate a first reference signal that varies with temperature. The adding logic may be configured to add the first reference signal to a correction signal received from a rectifying circuit to produce an output signal. The correction signal may comprise a rectified signal added to a first signal. The rectified signal may comprise a first component that varies with temperature along a first constant or continuously variable slope in one or more temperature ranges and a second component that is approximately zero everywhere else. The first current varies with temperature along a second constant or continuously variable slope.

BRIEF DESCRIPTION OF THE DRAWINGS

For a detailed description of various examples, reference will now be made to the accompanying drawings in which.

NOTATION AND NOMENCLATURE

Figure 1:
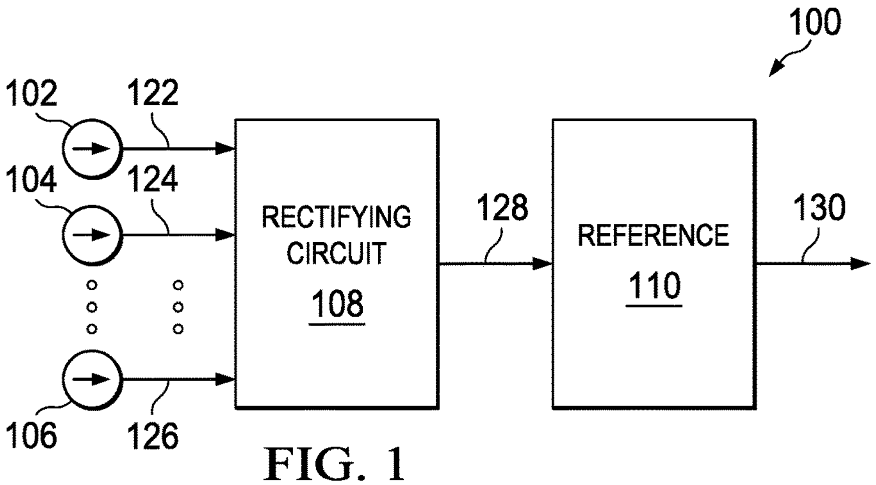
FIG. 1 shows a block diagram of a temperature dependent correction circuit in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms “including” and “comprising” are used in an open-ended fashion, and thus should be interpreted to mean “including, but not limited to . . . .” Also, the term “couple” or “couples” is intended to mean either an indirect or direct connection. Thus, if a first device couples to a second device, that connection may be through a direct connection, or through an indirect connection via other devices and connections. The recitation “based on” is intended to mean “based at least in part on.” Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Voltage and/or current output drift based on temperature may negatively affect many applications. For example, the operation of many precision applications, such as references, temperature sensors, temperature calibration devices, etc., depend on the production of a constant signal and/or a signal that does not drift. Since it is desirable to produce a constant output signal and/or a signal that does not drift based on temperature changes, corrections may be applied to limit the temperature based output drift.

Conventional signal correction techniques include global temperature correction and piecewise temperature correction. In global temperature correction, an average correction signal over the entire temperature range is applied to the signal producing device. However, applying global temperature correction is not practical if the temperature based drift is a complex polynomial with higher order terms due to the complexity and cost involved in obtaining a single global polynomial correction circuit on a chip whose coefficients are constant over the entire temperature range and from device to device.

In piecewise temperature correction, different corrections for different temperature ranges are applied to the signal producing device. In many conventional systems, a temperature sensor and/or comparator is utilized to determine when the temperature in the system reaches each of the different temperature ranges. A first signal (e.g., a current and/or voltage) that may vary based on temperature is applied to the signal producing device when the temperature of the system is in one temperature range. A second signal (e.g., a current and/or voltage) is applied (switched to) when the temperature of the system enters a second temperature range. Additional signals may also be applied based on the number of temperature ranges. In these systems, in order to avoid discontinuities, the first signal must equal the second signal at the time when the first temperature range ends and the second temperature range begins (i.e., a first temperature threshold). During final test, the signals are trimmed such that the first signal equals the second signal at the first temperature threshold. Unfortunately, during operation, the temperature sensor and/or comparator may have an offset or a hysteresis (i.e., the offset is different when the temperature is increasing than when the temperature is decreasing). Therefore, the first signal will not switch to the second signal exactly at the first temperature threshold. Even if the offset is trimmed at final test, not only is the correction limited by trim resolution, but also, the offset drifts over time after the circuit leaves the location of manufacture. Hence, discontinuities between the first signal and second signal may arise. Discontinuities are not desirable because a discontinuity may cause the signal producing device to produce a signal that suddenly jumps from one level (e.g., voltage and/or current) (due to the correction signal produced by the first signal) to a second level (due to the correction signal produced by the second signal) at the first temperature offset. Therefore, there is a need to create a temperature dependent correction circuit that provides a piecewise correction signal without discontinuities to a signal producing device.

In accordance with the disclosed principles, providing a piecewise correction signal that does not rely upon a temperature sensor and/or a comparator may eliminate discontinuities in the correction signal. The system may rectify a first signal that is produced by a supply source (e.g., a current supply and/or a voltage supply) as a first signal that varies with temperature. In other words, the first signal may be configured such that it is approximately zero (i.e., plus or minus 1 ampere and/or 5 volts from zero) at all temperature ranges except one temperature range. Additionally, the first signal may only be positive or negative during the one temperature range it is not zero. For example, the first signal may be a negative signal that varies until it reaches zero at a first temperature threshold. Once the temperature exceeds the first temperature threshold, the first signal is zero. A second signal that varies with temperature is produced by a second supply source. This second signal may not be rectified. Instead, the rectified first signal is added (instead of switched) to the second signal to create the current signal. The system may rectify additional signals to create additional pieces of the signal correction. Each of these additional signals is made approximately zero except during separate temperature ranges and added to the one signal that is not rectified. In this way, a piecewise signal correction may be created that does not have any discontinuities.

FIG. 1 shows a block diagram of temperature dependent correction circuit 100 in accordance with various embodiments. Temperature dependent correction circuit 100 may include supply sources 102-106, rectifying circuit 108, and reference 110. The ellipsis between the supply sources 102-106 indicates that there may be any number of supply sources, although, for clarity, only three are shown. The supply sources 102-106 may be any type of electronic circuit that generates a current which is independent of the voltage across the circuit (i.e., a current source) or generates a voltage which is independent of the current through the circuit (i.e., a voltage source). For example, the supply sources 102-106 may include a current-stable nonlinear current source, a bootstrapped current source, a resistor current source, a voltage compensation current source, a current compensation current source, a constant current diode, a Zener diode current source, an LED current source, a transistor current source with diode compensation, and/or any other type of current and/or voltage source. Supply sources 102-106 supply (i.e., generate) signals 122-126, respectively. Thus, supply source 102 supplies signal 122 which may be a current and/or voltage that varies with temperature along a first constant or continuously variable slope. Supply source 104 supplies signal 124 which may be a current and/or voltage that varies with temperature along a second constant or continuously variable slope. Supply source 106 supplies signal 126 which may be a current and/or voltage that varies with temperature along a third constant or continuously variable slope. The first, second, and third constant or continuously variable slopes may, in some embodiments, be different from one another.

Rectifying circuit 108 is configured to receive the signals 122-126 and rectify signals 122 and 126. In other words, rectifying circuit 108 may receive signals 122 and 126 and create rectified signals such that the signals 122 and 126 are positive or negative for a temperature range (e.g., a positive or negative current and/or voltage) and approximately zero at all other times. For example, rectifying circuit 108 may receive signal 122 from supply source 102. Rectifying circuit 108 then may generate a rectified signal that includes the negative component of the signal 122 for all temperatures less than a designed first temperature threshold. For all temperatures that exceed the first temperature threshold, the rectified signal for signal 122 is approximately zero. Continuing this example, rectifying circuit 108 may generate a rectified signal that includes the positive component of the signal 126 for all temperatures that exceed a designed second temperature threshold. For all temperatures that are less than the second temperature threshold, the rectified signal for signal 126 is approximately zero. In an embodiment, rectifying circuit 108 does not rectify signal 124. Instead, rectifying circuit 108 adds the rectified signals generated by rectifying circuit 108 to the signal 124 to produce correction signal 128. Therefore, continuing the previous example, because the rectified signal for signal 126 is approximately zero for the temperature range that is less than the first temperature threshold, one "piece" (i.e., component) of the correction signal 128 comprises the signal 122 added to the signal 124. Similarly, for the temperature range that exceeds the second temperature threshold, another "piece" of the correction signal 128 comprises the signal 126 added to the signal 124. For the temperature range between the first temperature threshold and the second temperature threshold, the correction signal 128 comprises the second signal 124.

Any number of additional supply sources may supply any number of additional signals to rectifying circuit 108. These additional signals may act in a similar manner as signals 122 and 126 (i.e., may be rectified such that each of these additional signals vary based on temperature during a temperature range and are approximately zero outside of their respective temperature ranges). One signal, signal 124 may not be rectified. All of the rectified additional signals then may be added to the rectified signal of signals 122 and 126 and to signal 124 to produce the correction signal 128. While one signal, signal 124 is not rectified in some examples, in some embodiments, all of the signals 122-126 are rectified. Additionally, in other embodiments, more than one of the signals 122-126 are not rectified. Furthermore, in some examples, some of the rectified signals may be non-zero signals in more than one temperature range.

Reference 110 is configured to receive the correction signal 128. Additionally, reference 110 may be configured to generate a first reference signal. Although the first reference signal ideally is a constant voltage and/or current, the first reference signal may vary with temperature. Therefore, correction signal 128 may be combined in the reference 110 with the first reference signal so that the output signal 130 is and/or is close to the desired output reference signal (i.e., is close to the desired output reference voltage and/or current). In other words, a voltage and/or current corresponding to the correction signal 128 is added to the first reference signal to produce the output signal 130. Reference 110 may be any type of voltage and/or current reference. In alternative embodiments, reference 110 may be any type of reference, temperature sensor, temperature calibration device, and/or any other type of device where it is desirable to produce a constant output signal and/or a signal that does not drift based on temperature changes.

Figure 2:
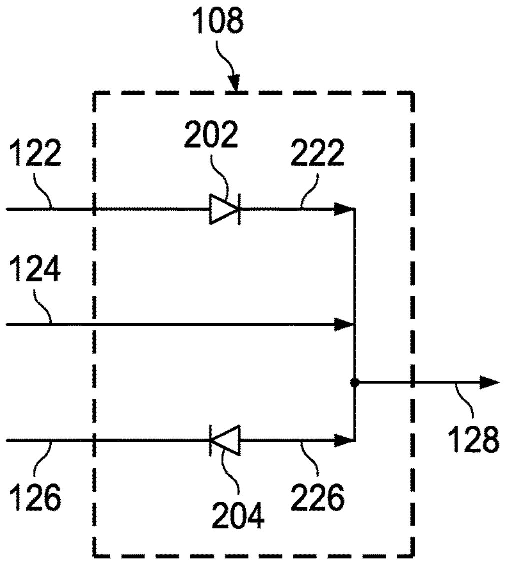
FIG. 2 shows a block diagram of a rectifying circuit in accordance with various embodiments.

FIG. 2 shows a block diagram of rectifying circuit 108 in accordance with various embodiments. Rectifying circuit 108 may, in an embodiment, include diodes 202-204. Diodes 202-204 may be any electronic component that conducts primarily in a single direction (i.e., it has low resistance to a signal in one direction with high resistance to a signal in the opposite direction). For example, diodes 202-204 may be semiconductor diodes. In an embodiment, diode 202 is configured to receive signal 122 from supply source 102. As a diode, diode 202 acts to block a signal in one direction, but allows a signal in the opposite direction to pass. Thus, depending on the direction of diode 202, either positive or negative signal may pass through resulting in rectified signal 222. More specifically, based on the direction of diode 202, the rectified signal 222 is comprised of two components: a first component signal that is either positive or negative (but not both) that varies with temperature along the same slope as signal 122 and a second component that is approximately zero. Furthermore, in some embodiments, supply source 102 is configured to supply signal 122 such that the signal 122, as a varying signal based on temperature, changes from positive to negative or negative to positive at one of the temperature thresholds (e.g., at the first temperature threshold). Therefore, based on the direction of diode 202, the resulting rectified signal 222 is either a positive or negative varying signal when the temperature is less than the first temperature threshold and approximately zero at all other times.

Diode 204 acts similarly to diode 202. While shown in the opposite direction as diode 202 in FIG. 2, diode 204 may be configured to pass a signal in the same direction as diode 202 as well depending on the correction requirements. Diode 204 acts to block a signal in one direction, but allows a signal in the opposite direction to pass. Thus, depending on the direction of diode 204, either positive or negative signal passes through resulting in rectified current 226. More specifically, based on the direction of diode 204, the rectified signal 226 is comprised of two components: a first component signal that is either positive or negative (but not both) that varies with temperature along the same constant or continuously variable slope as signal 126 and a second component that is approximately zero. Furthermore, in some embodiments, supply source 106 is configured to supply signal 126 such that the signal 126, as a varying signal based on temperature, changes from positive to negative or negative to positive at one of the temperature thresholds (e.g., at the second temperature threshold). Therefore, based on the direction of diode 204, the resulting rectified signal 226 is either a positive or negative varying signal when the temperature exceeds the second temperature threshold and approximately zero at all other times. As mentioned previously, signal 124, received from supply source 104, is not rectified by rectifying circuit 108. Instead, signal 124 is added to rectifying signals 222 and 226 to produce correction signal 128.

While diodes 202 and 204 are shown in FIG. 2 as implementing the rectification in rectifying circuit 108, any type of rectification method may be utilized. For example, the rectifying circuit 108 may add two signals which are equal and opposite during a temperature range. Thus, for instance, to produce the second component of rectified signal 222 (i.e., the component that is approximately zero), the rectifying circuit 108 may add an equal and opposite signal to the signal 122 during the temperature range that rectified signal 222 is to be approximately zero.

Figure 3:
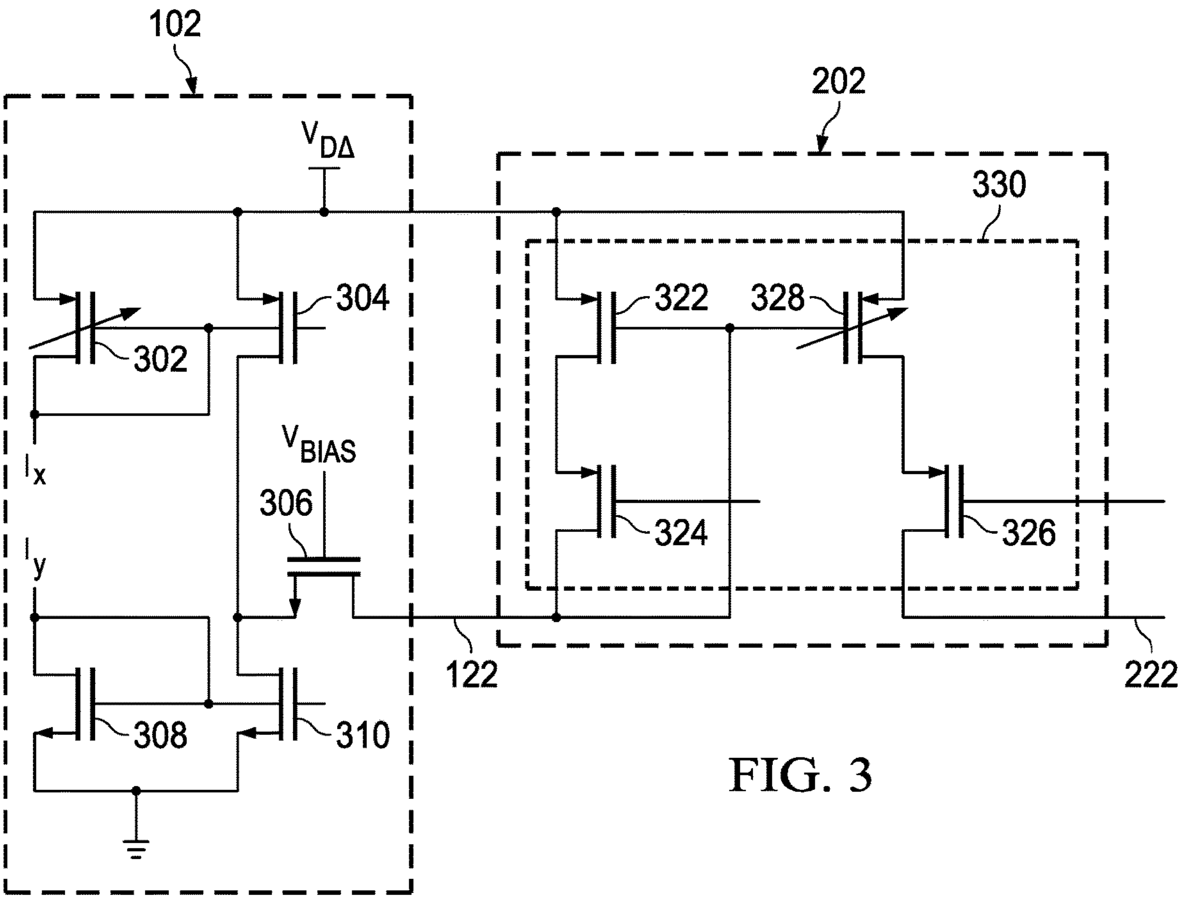
FIG. 3 shows a block diagram of an example supply source and diode in a rectifying circuit in accordance to various embodiments.

FIG. 3 shows a block diagram of an example supply source 102 and diode 202 in rectifying circuit 108 in accordance to various embodiments. More specifically, FIG. 3 shows supply source 102 as a current source that supplies signal 122, in this example as a current. In the example shown in FIG. 3, the signal 122 is generated utilizing transistors 302-310. In some embodiments, transistors 302-310 are metal-oxide-semiconductor field-effect transistors (MOSFETs). While shown as MOSFETS (MOS transistors—NMOS/PMOS), in some embodiments, transistors 302-310 may be junction gate field-effect transistors (JFET)

(including NJFET and PJFET transistors), and/or bipolar junction transistors (BJT) (including PNP and NPN transistors).

In the example shown in FIG. 3, diode 202 may be comprised of transistor 322 which in some examples are MOSFETs. Although shown as a PMOS transistor, transistor 322 may, in other examples be a NMOS transistor, PJET, NJFET, and/or BJT transistors. Additionally, diode 202 may comprise a current mirror or cascade current mirror 330 which may include transistors 322, 324, 326, and 328. By passing the signal 122 through the transistor 322 and current mirror 330, rectified signal 222 may be produced.

Figure 4:
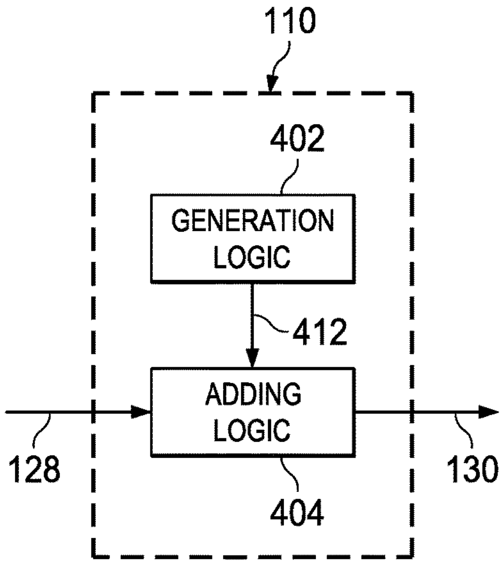
FIG. 4 shows a block diagram of a reference in accordance with various embodiments.

FIG. 4 shows a block diagram of reference 110 in accordance with various embodiments. Reference 110 may include generation logic 402 and adding logic 404. Generating logic 402 may be any circuitry that is configured to generate the reference signal 412. In some embodiments, the reference signal 412 varies based on temperature. Reference signal 412 may, in some embodiments, be a reference voltage, while in other embodiments, may be a current reference. The adding logic 404 receives the correction signal 128 and the reference signal 412. The adding logic 404 may be any circuitry that is configured to add the correction signal 128 to the reference signal 412. Thus, the adding logic 404 generates the output signal 130 based on this addition.

Figure 5:
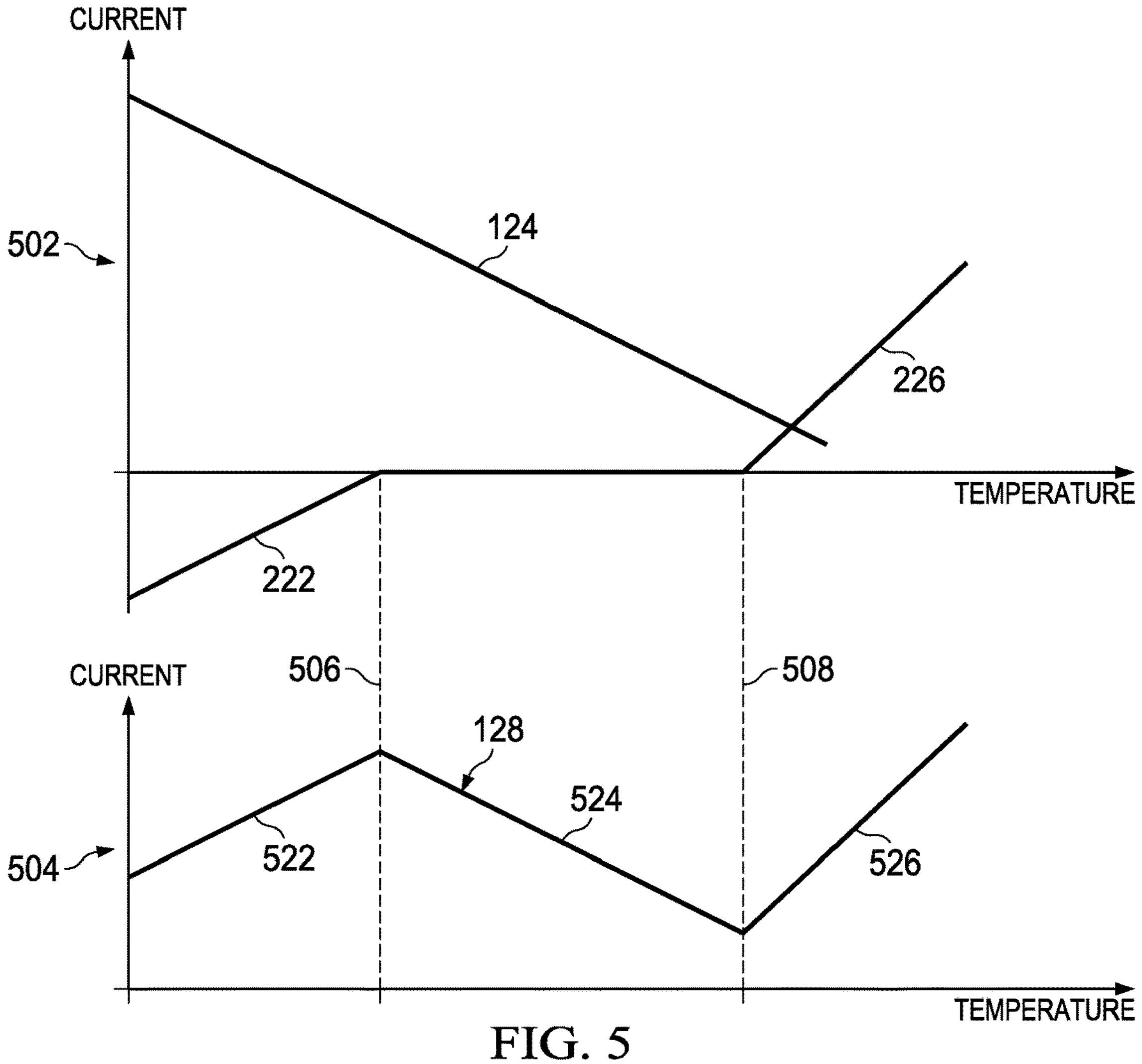
FIG. 5 shows example current versus temperature graphs for generating a correction signal in accordance with various embodiments.

FIG. 5 shows example current versus temperature graphs 502 and 504 for generating a correction signal in accordance with various embodiments. In graph 502, an example rectified signal 222 varies with respect to temperature at temperatures that are less than temperature threshold 506. At all temperatures that exceed temperature threshold 506, rectified signal 222 is approximately zero. Similarly, an example rectified signal 226 varies with respect to temperature at temperatures that exceed temperature threshold 508. At all temperatures that are less than temperature threshold 508, rectified signal 226 is approximately zero. Signal 124 varies with respect to temperature and is not rectified.

In graph 504, the rectified signal 222 from graph 502 is added with signal 124 and rectified signal 226 to produce correction signal 128. As shown in graph 504, because the rectified signal 226 is approximately zero at all temperatures less than temperature threshold 508, the first piecewise component 522 of correction signal 128 includes the signal 124 added to the varying component of rectified signal 222. Similarly, because the rectified signal 222 is approximately zero at all temperatures that exceed the temperature threshold 406, the third piecewise component 526 of correction signal 128 includes the signal 124 added to the varying component of rectified signal 226. Since both rectified signals 222 and 226 are zero between the temperature thresholds 506 and 508, the second piecewise component 524 of correction signal 128 is signal 124. Since there is no need to have a temperature sensor and/or comparator in the temperature dependent correction circuit 100 that may develop offsets, there are no discontinuities. As discussed previously, more than three supply sources may supply signals to produce a correction signal 128. Therefore, while only three temperature ranges are shown in FIG. 5, any number of temperature ranges incorporating any number of rectified signals may be utilized to produce correction signal 128.

Figure 6:
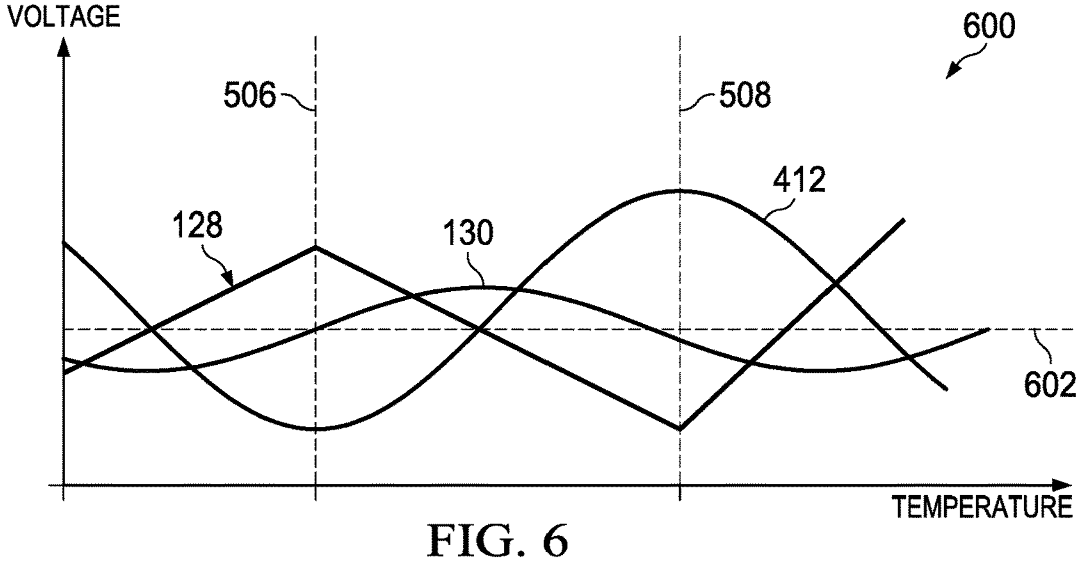
FIG. 6 shows an example voltage versus temperature graph for generating an output signal from a reference in accordance with various embodiments.

FIG. 6 shows an example voltage versus temperature graph 600 for generating an output signal from a reference in accordance with various embodiments. Graph 600 shows the reference signal 412 generated by generation logic 402 in reference 110. As shown in graph 600, reference signal 412 varies with temperature. This variation may be determined during testing of the reference 110. The temperature thresholds (e.g., temperature thresholds 506 and 508) may be determined based on the variation of the reference signal 412. In this example, the temperature thresholds 506 and 508 are determined based on the direction of the voltage and/or current variation over temperature of reference signal 412. The reference signal 412, in this example, decreases until the temperature reaches temperature threshold 506, increases between temperature threshold 506 and temperature threshold 508, and decreases again when the temperature exceeds temperature threshold 508.

Line 602 is an indication of an ideal voltage to be generated by reference 110. Line 602 is a constant voltage that does not vary by temperature. Thus, a correction signal 128 is applied to the reference 110 by adding logic 404 to produce an output signal 130 that is closer to the ideal voltage represented by line 602 than the reference signal 412. As shown in graph 600, a voltage corresponding to the correction signal 128 is added to the reference signal 412 to produce the output signal 130. The output signal 130 does not vary as much over temperature as reference signal 412 and is closer to the ideal voltage represented by line 602.

Figure 7:
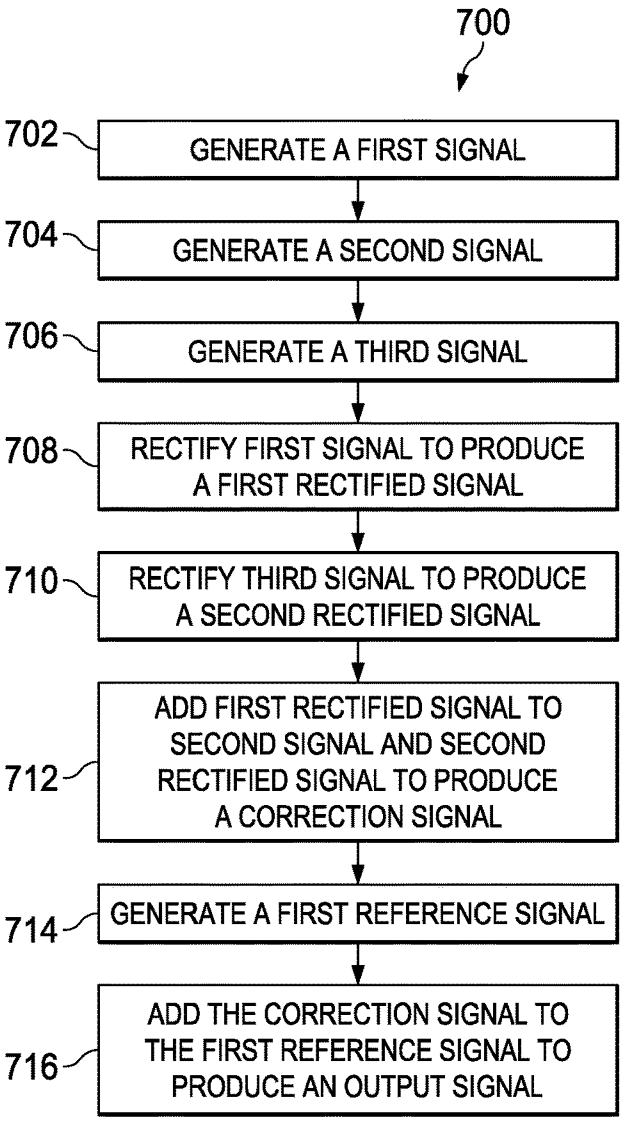
FIG. 7 shows a flow diagram of a method for generating a corrected output signal from a reference in accordance with various embodiments.

FIG. 7 shows a flow diagram of a method 700 for generating a corrected output voltage, such as output voltage 130, from a voltage reference, such as voltage reference 110, in accordance with various embodiments. Though depicted sequentially as a matter of convenience, at least some of the actions shown in method 700 can be performed in a different order and/or performed in parallel. Additionally, some embodiments may perform only some of the actions shown or may perform additional actions. In some embodiments, at least some of the operations of the method 700, as well as other operations described herein, can be performed by the supply sources 102-106, rectifying circuit 108, and/or reference 110 implemented by a processor executing instructions stored in a non-transitory computer readable storage medium or a state machine.

The method 700 begins in block 702 with generating a first signal, such as signal 122. The first signal may, in some embodiments, be generated by supply source 102, and vary with temperature along a first constant or continuously variable slope. In block 704, the method 700 continues with generating a second signal, such as signal 124. The second signal may, in some embodiments, be generated by supply source 104, and vary with temperature along a second constant or continuously variable slope. The method 700 continues in block 706 with generating a third signal, such as signal 126. The third signal may, in some embodiments, be generated by supply source 106, and vary with temperature along a third constant or continuously variable slope.

In block 708, the method 700 continues with rectifying the first signal (e.g., signal 122) to produce a first rectified signal, such as rectified signal 222. The first signal may be rectified utilizing rectifying circuit 108 which may comprise diodes 202 and 204. The rectification of the first signal may comprise passing only a positive signal component of the first signal or only a negative signal component of the first current through the rectifying circuit 108. The first rectified signal may vary with temperature for a first range of temperature. The first range of temperature may correspond to a region where the temperature of the rectifying circuit 108 is less than a first temperature threshold, such as temperature threshold 506. The first rectified signal may additionally be approximately zero during a second range of temperature. The second range of temperature may correspond to a region where the temperature of the rectifying circuit 108 exceeds the first temperature threshold.

The method 700 continues in block 710 with rectifying the third signal (e.g., signal 126) to produce a second rectified signal, such as rectified signal 226. The third signal may be rectified utilizing rectifying circuit 108 which may comprise diodes 202 and 204. The rectifying the third signal may comprise passing only a positive signal component of the third signal or only a negative signal component of the third signal through the rectifying circuit 108. The second rectified signal may vary with temperature for a third range of temperature. The third range of temperature may correspond to a region where the temperature of the rectifying circuit 108 exceeds a second temperature threshold, such as temperature threshold 508. The second rectified signal may additionally be approximately zero during a fourth range of temperature. The fourth range of temperature may correspond to a time period where the temperature of the rectifying circuit 108 is less than the second temperature threshold.

In block 712, the method 700 continues with adding the first rectified signal (e.g., rectified signal 222) to the second signal (e.g., signal 124) and the second rectified signal (e.g., rectified signal 226) to produce a correction signal, such as correction signal 128. The method 700 continues in block 714 with generating a first reference signal, such as reference signal 412, utilizing a reference, such as reference 110. The first reference signal may vary with temperature. In block 716, the method 700 continues with adding the correction signal to the first reference signal to produce an output signal, such as output signal 130.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A reference generator comprising:

at least three reference current sources;

a first diode having an anode and a cathode wherein the anode is coupled to a first reference current source;

a second diode having an anode and a cathode wherein the cathode is coupled to a second reference current source;

adding logic circuitry coupled to the cathode of the first diode;

generation logic circuitry coupled to the adding logic circuitry;

wherein the cathode of the first diode is coupled to the anode of the second diode; and wherein a third reference current source is coupled to the cathode of the first diode.

2. The reference generator of claim 1 wherein the generation logic circuitry is configured to generate a first reference signal that varies with temperature.

3. The reference generator of claim 2 wherein the adding logic circuitry is configured to add the first reference signal to a correction signal received from a rectifying circuit to produce an output signal, the correction signal comprising a rectified signal added to a first signal.

4. The reference generator of claim 3 wherein the rectified signal comprises a first component that varies with temperature along a first constant or continuously variable slope and a second component that is approximately zero.

5. The reference generator of claim 2 wherein the first reference signal varies with temperature along a second constant or continuously variable slope.

6. A reference generator comprising:

at least three reference voltage sources;

a first diode having an anode and a cathode wherein the anode is coupled to a first reference voltage source;

a second diode having an anode and a cathode wherein the cathode is coupled to a second reference voltage source;

adding logic circuitry coupled to the cathode of the first diode;

generation logic circuitry coupled to the adding logic circuitry;

wherein the cathode of the first diode is coupled to the anode of the second diode; and wherein a third reference voltage source is coupled to the cathode of the first diode.

7. The reference generator of claim 6 wherein the generation logic circuitry is configured to generate a first reference signal that varies with temperature.

8. The reference generator of claim 7 wherein the adding logic circuitry is configured to add the first reference signal to a correction signal received from a rectifying circuit to produce an output signal, the correction signal comprising a rectified signal added to a first signal.

9. The reference generator of claim 8 wherein the rectified signal comprises a first component that varies with temperature along a first constant or continuously variable slope and a second component that is approximately zero.

10. The reference generator of claim 7 wherein the first reference signal varies with temperature along a second constant or continuously variable slope.

* * * * *